US 6,567,661 B2

(12) United States Patent
McDonnell et al.

(10) Patent No.: US 6,567,661 B2
(45) Date of Patent: May 20, 2003

(54) DISTRIBUTED TELEMETRY METHOD AND SYSTEM

(75) Inventors: James Thomas Edward McDonnell, Bristol (GB); Michael P. Spratt, Bath (GB); John Deryk Waters, Bath (GB); Simon E. Crouch, Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/800,682

(22) Filed: Mar. 7, 2001

(65) Prior Publication Data

US 2001/0028313 A1 Oct. 11, 2001

(30) Foreign Application Priority Data

Mar. 7, 2000 (GB) .............................................. 0005315

(51) Int. Cl.[7] ................................................. H04Q 7/20
(52) U.S. Cl. ........................ 455/426; 455/414; 455/466; 455/456; 340/870.07; 340/539; 340/870.11; 340/870.28
(58) Field of Search ................................ 455/435, 414, 455/426, 466, 456, 552; 340/539, 870.07, 870.28, 870.11

(56) References Cited

U.S. PATENT DOCUMENTS

| 5,481,588 A | * | 1/1996 | Rickli et al. .................. 379/32 |
| 5,546,444 A | * | 8/1996 | Roach et al. ................. 455/412 |
| 5,767,788 A | * | 6/1998 | Ness ....................... 340/825.49 |
| 5,828,962 A | * | 10/1998 | Ho-A-Chuck ................. 455/446 |
| 5,946,613 A | * | 8/1999 | Hayes et al. ................. 455/406 |
| 5,990,833 A | | 10/1999 | Ahlbom et al. |
| 5,983,109 A | * | 11/1999 | Montoya ..................... 455/456 |
| 6,442,394 B1 | * | 8/2002 | Valentine et al. ........... 455/456 |
| 2002/0065717 A1 | * | 5/2002 | Miller et al. ................... 705/14 |

FOREIGN PATENT DOCUMENTS

| DE | 4428729 A1 | 1/1997 |
| EP | 0946004 A2 | 9/1999 |
| GB | 2260050 A | 3/1993 |

OTHER PUBLICATIONS

European Patent Office Search Report under Section 17, prepared by Examiner J. Betts, Sep. 8, 2000.

* cited by examiner

Primary Examiner—William Trost
Assistant Examiner—Sharad Rampuria (57) ABSTRACT

A distributed telemetry method is effected by coordinating the taking of readings of a parameter by mobile phone users, the parameter readings being then sent to a service system together with location information on the users. Collating the readings and location information enables a representation to be generated of the geographic variation of the measured parameter. Incentives can be offered to encourage cell phone users to participate in the telemetry method.

12 Claims, 5 Drawing Sheets

(Prior Art)

Figure 3

(Prior Art)

DISTRIBUTED TELEMETRY METHOD AND SYSTEM

FIELD OF THE INVENTION

The present invention relates to a method and system for effecting distributed telemetry that utilises a mobile radio infrastructure.

BACKGROUND OF THE INVENTION

Communication infrastructures suitable for mobile users (in particular, though not exclusively, cellular radio infrastructures) have now become widely adopted. Whilst the primary driver has been mobile telephony, the desire to implement mobile data-based services over these infrastructures, has led to the rapid development of data-capable bearer services across such infrastructures. This has opened up the possibility of many Internet-based services being available to mobile users.

Figure 1:
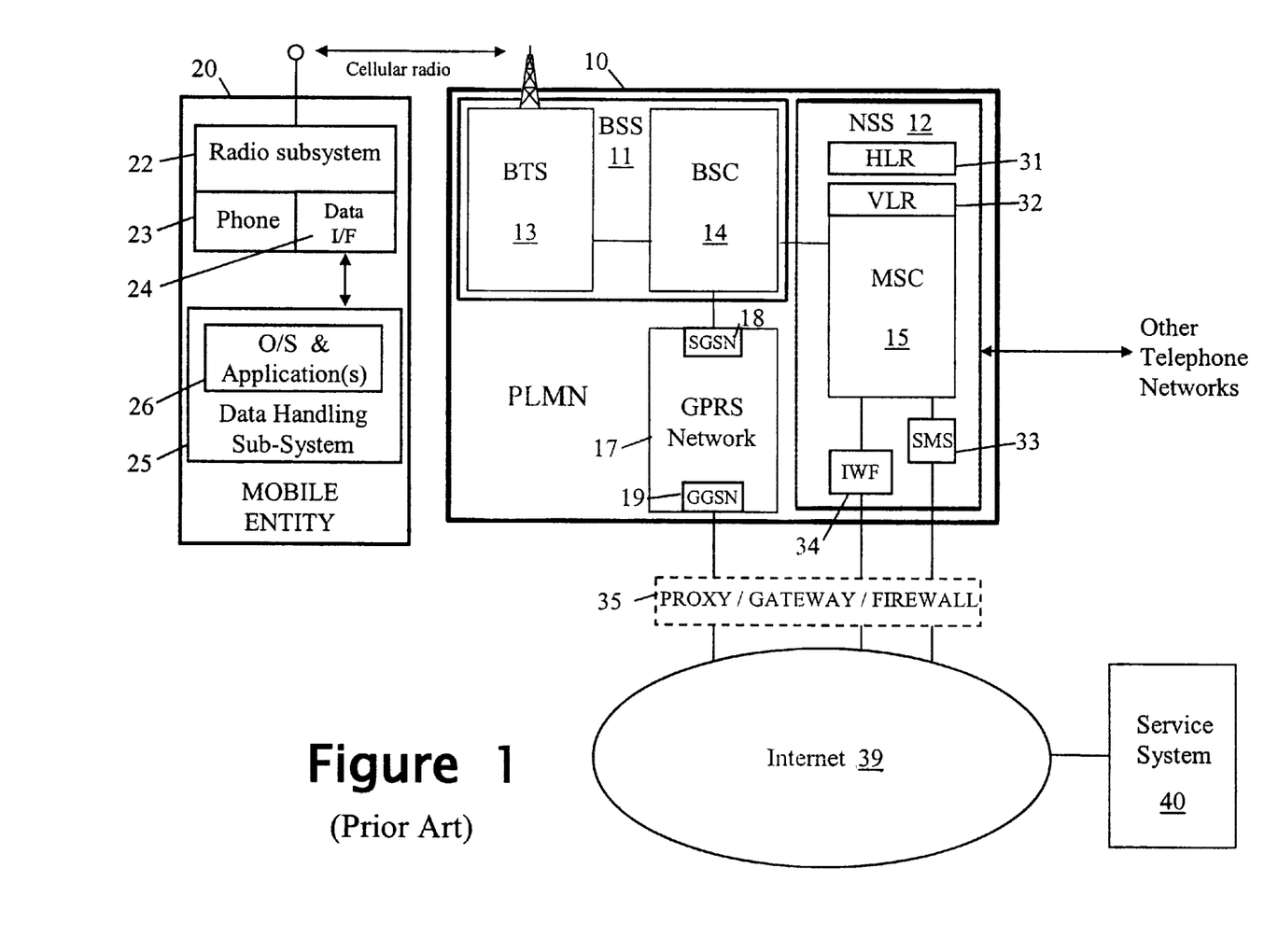
FIG. 1 is a diagram of a known communications infrastructure usable for transferring voice and data to/from a mobile entity.
Figure 2:
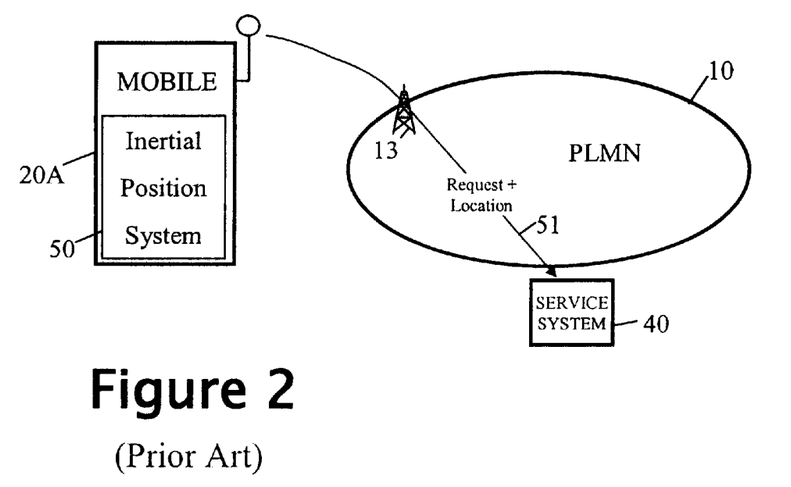
FIG. 2 is a diagram illustrating one known approach to determining the location of a mobile entity, this approach involving providing the entity with an inertial positioning system.

By way of example, FIG. 1 shows one form of known communication infrastructure for mobile users providing both telephony and data-bearer services. In this example, a mobile entity 20, provided with a radio subsystem 22 and a phone subsystem 23, communicates with the fixed infrastructure of GSM PLMN (Public Land Mobile Network) 10 to provide basic voice telephony services. In addition, the mobile entity 20 includes a data-handling subsystem 25 interworking, via data interface 24, with the radio subsystem 22 for the transmission and reception of data over a data-capable bearer service provided by the PLMN; the data-capable bearer service enables the mobile entity 20 to communicate with a service system 40 connected to the public Internet 39. The data handling subsystem 25 supports an operating environment 26 in which applications run, the operating environment including an appropriate communications stack.

More particularly, the fixed infrastructure 10 of the GSM PLMN comprises one or more Base Station Subsystems (BSS) 11 and a Network and Switching Subsystem NSS 12. Each BSS 11 comprises a Base Station Controller (BSC) 14 controlling multiple Base Transceiver Stations (BTS) 13 each associated with a respective "cell" of the radio network. When active, the radio subsystem 22 of the mobile entity 20 communicates via a radio link with the BTS 13 of the cell in which the mobile entity is currently located. As regards the NSS 12, this comprises one or more Mobile Switching Centers (MSC) 15 together with other elements such as Visitor Location Registers 32 and Home Location Register 32.

When the mobile entity 20 is used to make a normal telephone call, a traffic circuit for carrying digitised voice is set up through the relevant BSS 11 to the NSS 12 which is then responsible for routing the call to the target phone (whether in the same PLMN or in another network).

With respect to data transmission to/from the mobile entity 20, in the present example three different data-capable bearer services are depicted though other possibilities exist. A first data-capable bearer service is available in the form of a Circuit Switched Data (CSD) service; in this case a full traffic circuit is used for carrying data and the MSC 32 routes the circuit to an InterWorking Function IWF 34 the precise nature of which depends on what is connected to the other side of the IWF. Thus, IWF could be configured to provide direct access to the public Internet 39 (that is, provide functionality similar to an IAP—Internet Access Provider IAP). Alternatively, the IWF could simply be a modem connecting to a PSTN; in this case, Internet access can be achieved by connection across the PSTN to a standard IAP.

A second, low bandwidth, data-capable bearer service is available through use of the Short Message Service that passes data carried in signalling channel slots to an SMS unit which can be arranged to provide connectivity to the public Internet 39.

A third data-capable bearer service is provided in the form of GPRS (General Packet Radio Service which enables IP (or X.25) packet data to be passed from the data handling system of the mobile entity 20, via the data interface 24, radio subsystem 21 and relevant BSS 11, to a GPRS network 17 of the PLMN 10 (and vice versa). The GPRS network 17 includes a SGSN (Serving GPRS Support Node) 18 interfacing BSC 14 with the network 17, and a GGSN (Gateway GPRS Support Node) interfacing the network 17 with an external network (in this example, the public Internet 39). Full details of GPRS can be found in the ETSI (European Telecommunications Standards Institute) GSM 03.60 specification. Using GPRS, the mobile entity 20 can exchange packet data via the BSS 11 and GPRS network 17 with entities connected to the public Internet 39.

The data connection between the PLMN 10 and the Internet 39 will generally be through a firewall 35 with proxy and/or gateway functionality.

Different data-capable bearer services to those described above may be provided, the described services being simply examples of what is possible.

In FIG. 1, a service system 40 is shown connected to the Internet 40, this service system being accessible to the OS/application 26 running in the mobile entity by use of any of the data-capable bearer services described above. The data-capable bearer services could equally provide access to a service system that is within the domain of the PLMN operator or is connected to another public or private data network.

With regard to the OS/application software 26 running in the data handling subsystem 25 of the mobile entity 20, this could, for example, be a WAP application running on top of a WAP stack where "WAP" is the Wireless Application Protocol standard. Details of WAP can be found, for example, in the book "Official Wireless Application Protocol" Wireless Application Protocol Forum, Ltd published 1999 Wiley Computer Publishing. Where the OS/application software is WAP compliant, the firewall will generally also serve as a WAP proxy and gateway. Of course, OS/application 26 can comprise other functionality (for example, an e-mail client) instead of, or additional to, the WAP functionality.

The mobile entity 20 may take many different forms. For example, it could be two separate units such as a mobile phone (providing elements 22–24) and a mobile PC (data-handling system 25) coupled by an appropriate link (wireline, infrared or even short range radio system such as Bluetooth). Alternatively, mobile entity 20 could be a single unit such as a mobile phone with WAP functionality. Of course, if only data transmission/reception is required (and not voice), the phone functionality 24 can be omitted; an example of this is a PDA with built-in GSM data-capable functionality whilst another example is a digital camera (the data-handling subsystem) also with built-in GSM data-capable functionality enabling the upload of digital images from the camera to a storage server.

Whilst the above description has been given with reference to a PLMN based on GSM technology, it will be appreciated that many other cellular radio technologies exist and can typically provide the same type of functionality as described for the GSM PLMN 10.

Recently, must interest has been shown in "location-based", "location-dependent", or "location-aware" services for mobile users, these being services that take account of the current location of the user (or other mobile party). The most basic form of this service is the emergency location service whereby a user in trouble can press a panic button on their mobile phone to send an emergency request-for-assistance message with their location data appended. Another well known location-based service is the provision of traffic and route-guiding information to vehicle drivers based on their current position. A further known service is a "yellow pages" service where a user can find out about amenities (shops, restaurants, theatres, etc.) local to their current location. The term "location-aware services" will be used herein to refer generically to these and similar services where a location dependency exists.

Location-aware services all require user location as an input parameter. A number of methods already exist for determining the location of a mobile user as represented by an associated mobile equipment. Example location-determining methods will now be described with reference to FIGS. 2 to 5. As will be seen, some of these methods result in the user knowing their location thereby enabling them to transmit it to a location-aware service they are interested in receiving, whilst other of the methods result in the user's location becoming known to a network entity from where it can be supplied directly to a location-aware service (generally only with the consent of the user concerned). It is to be understood that additional methods to those illustrated in FIGS. 2 to 5 exist.

As well as location determination, FIGS. 2 to 5 also illustrate how the mobile entity requests a location-aware service provided by service system 40. In the present examples, the request is depicted as being passed over a cellular mobile network (PLMN 10) to the service system 40. The PLMN is, for example, similar to that depicted in FIG. 1 with the service request being made using a data-capable bearer service of the PLMN. The service system 40 may be part of the PLMN itself or connected to it through a data network such as the public Internet. It should, however, be understood that infrastructure other than a cellular network may alternatively be used for making the service request The location-determining method illustrated in FIG. 2 uses an inertial positioning system 50 provided in the mobile entity 20A, this system 50 determining the displacement of the mobile entity from an initial reference position. When the mobile entity 20A wishes to invoke a location-aware service, it passes its current position to the corresponding service system 40 along with the service request 51. This approach avoids the need for an infrastructure to provide an external frame of reference; however, cost, size and long-term accuracy concerns currently make such systems unattractive for incorporation into mass-market handheld devices.

Figure 3:
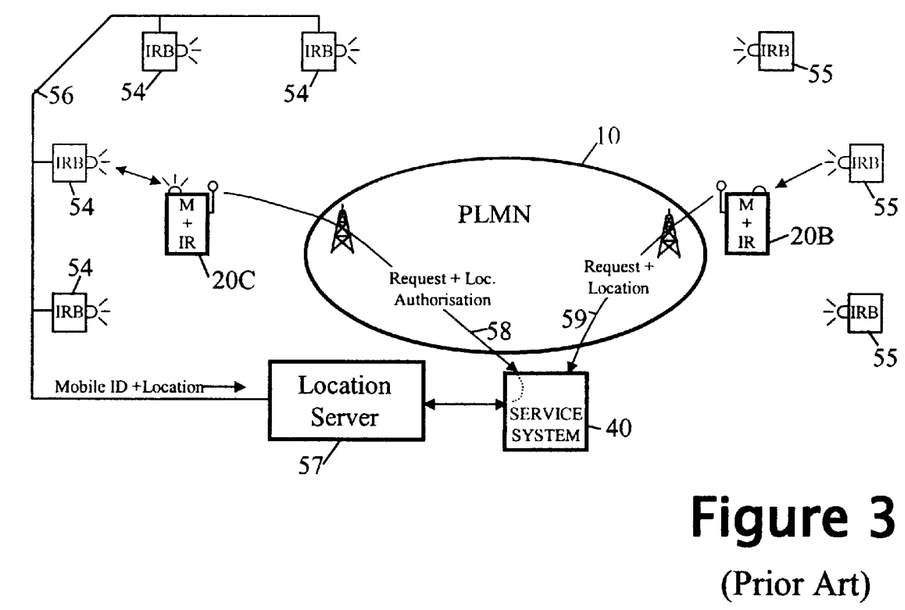
FIG. 3 is a diagram illustrating another known approach to determining the location of a mobile entity, this approach being based on proximity of the mobile entity to fixed-position local beacons.

FIG. 3 shows two different location-determining methods both involving the use of local, fixed-position, beacons here shown as infra-red beacons IRD though other technologies, such as short-range radio systems (in particular, "Bluetooth" systems) may equally be used. The right hand half of FIG. 3 show a number of independent beacons 55 that continually transmit their individual locations. Mobile entity 20B is arranged to pick up the transmissions from a beacon when sufficiently close, thereby establishing its position to the accuracy of its range of reception. This location data can then be appended to a request 59 made by the mobile entity 20B to a location-aware service available from service system 40. A variation on this arrangement is for the beacons 55 to transmit information which whilst not directly location data, can be used to look up such data (for example, the data may be the Internet home page URL of a store housing the beacon 55 concerned, this home page giving the store location—or at least identity, thereby enabling look-up of location in a directory service).

In the left-hand half of FIG. 3, the IRB beacons 54 are all connected to a network that connects to a location server 57. The beacons 54 transmit a presence signal and when mobile entity 20C is sufficiently close to a beacon to pick up the presence signal, it responds by sending its identity to the beacon. (Thus, in this embodiment, both the beacons 54 and mobile entity 20C can both receive and transmit IR signals whereas beacons 55 only transmit, and mobile entity 20B only receives, IR signals). Upon a beacon 54 receiving a mobile entity's identity, it sends out a message over network 56 to location server 57, this message linking the identity of the mobile entity 20C to the location of the relevant beacon 54. Now when the mobile entity wishes to invoke a location-aware service provided by the service system 40, since it does not know its location it must include it's identity in the service request 58 and rely on the service system 40 to look up the current location of the mobile entity in the location server 57. Because location data is personal and potentially very sensitive, the location server 57 will generally only supply location data to the service system 40 after the latter has produced an authorizing token supplied by the mobile entity 20B in request 58. It will be appreciated that whilst service system 40 is depicted as handling service requests form both types of mobile entity 20 B and 20C, separate systems 40 may be provided for each mobile type (this is likewise true in respect of the service systems depicted in FIGS. 4 and 5).

Figure 4:
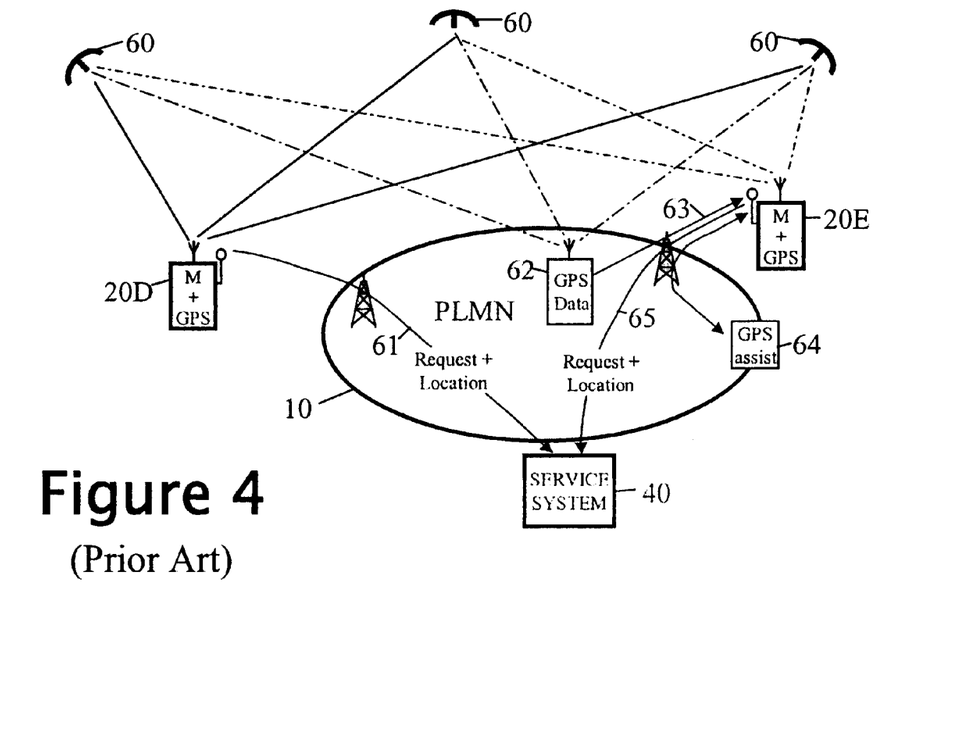
FIG. 4 is a diagram illustrating a further known approach to determining the location of a mobile entity, this approach involving the use of GPS satellites.

FIG. 4 depicts several forms of GPS location-determining system. On the left-hand side of FIG. 4, a mobile entity 20D is provided with a standard GPS module and is capable of determining the location of entity 20D by picking up signals from satellites 60. The entity 20D can then supply this location when requesting, in request 61, a location-aware service from service system 40.

The right-hand side of FIG. 4 depicts, in relation to mobile entity 20E, two ways in which assistance can be provided to the entity in deriving location from GPS satellites.

Firstly, the PLMN 10 can be provided with fixed GPS receivers 62 that each continuously keep track of the satellites 60 visible from the receiver and pass information in messages 63 to local mobile entities 20E as to where to look for these satellites and estimated signal arrival times; this enables the mobile entities 20E to substantially reduce acquisition time for the satellites and increase accuracy of measurement (see "Geolocation Technology Pinpoints Wireless 911 calls within 15 Feet" Jul. 1, 1999 Lucent Technologies, Bell Labs). Secondly, as an alternative enhancement, the processing load on the mobile entity 20E can be reduced and encoded jitter removed using the services of network entity 64 (in or accessible through PLMN 10).

One the mobile unit 20E has determined its location, it can pass this information in request 65 when invoking a location-aware service provided by service system 40.

Figure 5:
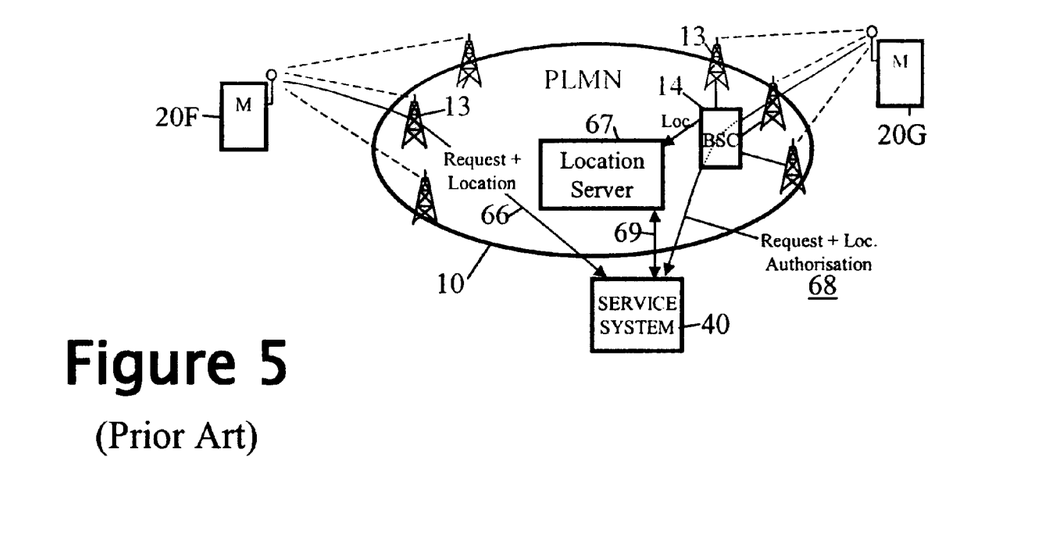
FIG. 5 is a diagram illustrating a still further approach to determining the location of a mobile entity, this approach being based on the use of signals present in a cellular mobile radio communications system.

FIG. 5 depicts two general approaches to location determination from signals present in a cellular radio infrastructure. First, it can be noted that in general both the mobile entity and the network will know the identity of the cell in which the mobile entity currently resides, this information being provided as part of the normal operation of the system. (Although in a system such as GSM, the network may only store current location to a resolution of a collection of cells known as a "location area", the actual current cell ID will generally be derivable from monitoring the signals exchanged between the BSC 14 and the mobile entity). Beyond current basic cell ID, it is possible to get a more accurate fix by measuring timing and/or directional parameters between the mobile entity and multiple BTSs 13, these measurement being done either in the network or the mobile entity (see, for example, International Application WO 99/04582 that describes various techniques for effecting location determination in the mobile and WO 99/55114 that describes location determination by the mobile network in response to requests made by location-aware applications to a mobile location center-server-of the mobile network).

The left-hand half of FIG. 5 depicts the case of location determination being done in the mobile entity 20F by, for example, making Observed Time Difference (OTD) measurements with respect to signals from BTSs 13 and calculating location using a knowledge of BTS locations. The location data is subsequently appended to a service request 66 sent to service system 40 in respect of a location-aware service. The calculation load on mobile entity 20F could be reduced and the need for the mobile to know BTS locations avoided, by having a network entity do some of the work. The right-hand half of FIG. 5 depicts the case of location determination being done in the network, for example, by making Timing Advance measurements for three BTSs 13 and using these measurements to derive location (this derivation typically being done in a unit associated with BSC 14). The resultant location data is passed to a location server 67 from where it can be made available to authorised services. As for the mobile entity 20C in FIG. 3, when the mobile entity 20G of FIG. 5 wishes to invoke a location-aware service available on service system 50, it sends a request 69 including an authorisation token and its ID (possible embedded in the token) to the service system 40; the service system then uses the authorisation token to obtain the current location of the mobile entity 20G from the location server 67.

In the above examples, where the mobile entity is responsible for determining location, this will generally be done only at the time the location-aware service is being requested. Where location determination is done by the infrastructure, it may be practical for systems covering only a limited number of users (such as the system illustrated in the left-hand half of Figure 2 where a number of infrared beacons 54 will cover a generally fairly limited) for location-data collection to be done whenever a mobile entity is newly detected by an IRB, this data being passed to location server 57 where it is cached for use when needed. However, for systems covering large areas with potentially a large number of mobile entities, such as the FIG. 5 system, it is more efficient to effect location determination as and when there is a perceived need to do so; thus, location determination may be triggered by the location server 67 in response to the service request 68 from the mobile entity 20G or the mobile entity may, immediately prior to making request 68, directly trigger BSC 14 to effect a location determination and feed the result to location server 67.

Further with respect to the location servers 57,67, whilst access authorisation by location-aware services has been described as being through authorisation tokens supplied by the mobile entities concerned, other authorisation techniques can be used. In particular, a location-aware service can be prior authorised with the location server in respect of particular mobile entities; in this case, each request from the service for location data needs only to establish that the request comes from a service authorised in respect of the mobile entity for which the location data is requested.

Figure 6:
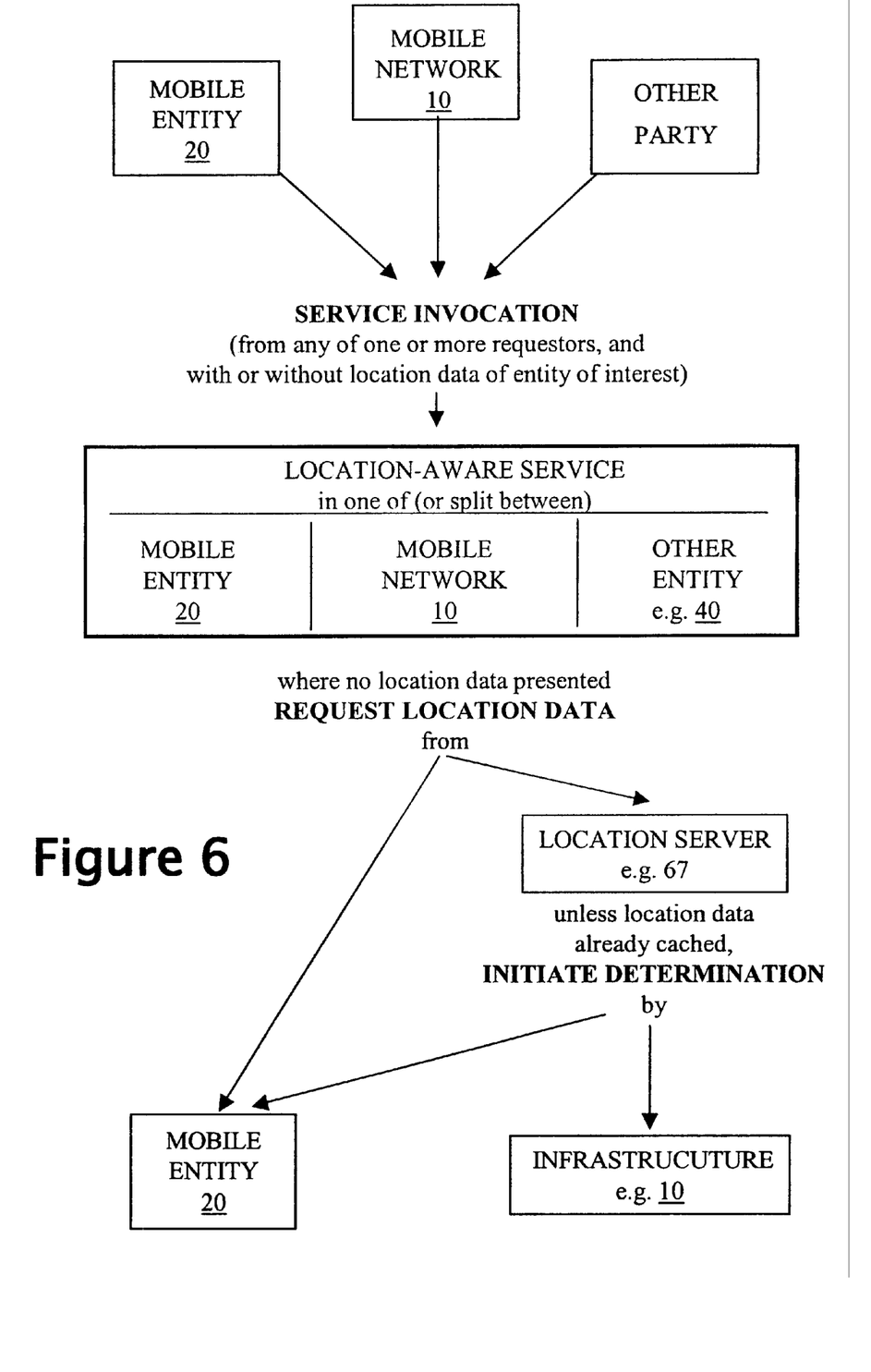
FIG. 6 is a diagram depicting the possible ways in which location information is made available to a location-aware service.

As already indicated, FIGS. 2 to 5 depict only some examples of how location determination can be achieved, there being many other possible combinations of technology used and where in the system the location-determining measurements are made and location is calculated, stored and used. Thus, the location-aware service may reside in the mobile entity whose location is of interest, in a network-connected service system 40 (as illustrated), or even in another mobile entity. Furthermore, whilst in the examples of FIGS. 2 to 5, invocation of the location-aware service has been by the mobile entity whose location is of interest, the nature of the location-aware service may be such that it is invoked by another party (including, potentially, the PLMN itself). In this case, unless the invoking party already knows the location of he mobile entity and can pass this information to the location-aware service (which may, for example, maybe situation where the PLMN invokes the service), it is the location-aware service that is responsible for obtaining the required location data, either by sending a request to the mobile entity itself or by requesting the data from a location server. Unless the location server already has the needed information in cache, the server proceeds to obtain the data either by interrogating the mobile entity or by triggering infrastructure elements to locate the mobile. For example, where a location-aware service running on service system 40 in FIG. 5 needs to find the location of mobile 20G, it could be arranged to do so by requesting this information from location server 67 which in turn requests the location data from the relevant BSC, the latter then making the necessary determination using measurements from BTSs 13. FIG. 6 depicts the various possibilities discussed above.

Although in the foregoing, the provision of location data through the mobile radio infrastructure to the mobile entity has been treated as a service effected over a data-capable bearer channel, it may be expected that as location data becomes considered a basic element of mobile radio infrastructure services, provision will be made in the relevant mobile radio standards for location data to be passed over a signalling channel to the mobile entity.

The present invention has an object the provision of a distributed telemetry method and system which can easily and cheaply be used to provide large geographical coverage with very many observation points. As will be seen this involves the use of a mobile radio infrastructure. Mobile radios have, of course, long been used to collect observations from geographically dispersed locations such as battle field locations. However such prior art primarily involves ad hoc queries and does not systematically use the mobile radio infrastructure provided by the cellular radio networks.

SUMMARY OF THE INVENTION

According to one aspect of the present invention, there is provided a distributed telemetry method, comprising the steps of:
 (a) coordinating the taking of readings of a parameter over a geographic area by mobile entities or their users,
 (b) using the mobile entities to send the readings to a service system via a mobile radio infrastructure;
 (c) providing to the service system the location of each mobile entity that sends a reading;

(d) collating the readings and location information at the service system to provide a representation of the geographic variation of said parameter.

As used herein, the term "reading" is to be understood broadly as covering both equipment-based measurements and user observations.

The method of the invention preferably relies on users of mobile entities (for example, cell phones) who have registered voluntarily with the service system to provide parameter readings. The service system is responsible for coordinating the taking of reading by its registered users.

Cell phone users could be offered an incentive to register with the service system and provide readings to it.

The coordination of the taking of readings can be effected by the service system sending out a trigger message over the mobile radio infrastructure, or by the registered users/mobile entities taking readings at predetermined times prior-designated by the service system.

The distributed telemetry method can be used, for example, to measure physical parameters or observed behavioural parameters.

According to another aspect of the present invention, there is provided a distributed telemetry system comprising:
  a mobile radio infrastructure;
  a service system connected to the mobile radio infrastructure and comprising a database of registered users, means for receiving data via the mobile radio infrastructure, and data collation means;
  a plurality of mobile entities associated with respective registered users;
  means for causing the coordinated taking of reading data about a particular parameter by the registered users or their mobile entities, each mobile entity having means for sending the reading data to the service system through the mobile radio infrastructure; and
  location-providing means for providing the service system with the location of each mobile entity that sends reading data to the service system;
the data collation means being operative to collate the reading data and location information to provide a representation of the geographic variation of said parameter.

BRIEF DESCRIPTION OF THE DRAWINGS

A distributed telemetry method and system, both embodying the present invention, will now be described, by way of non-limiting example, with reference to the accompanying diagrammatic drawings, in which.

BEST MODE OF CARRYING OUT THE INVENTION

Figure 7:
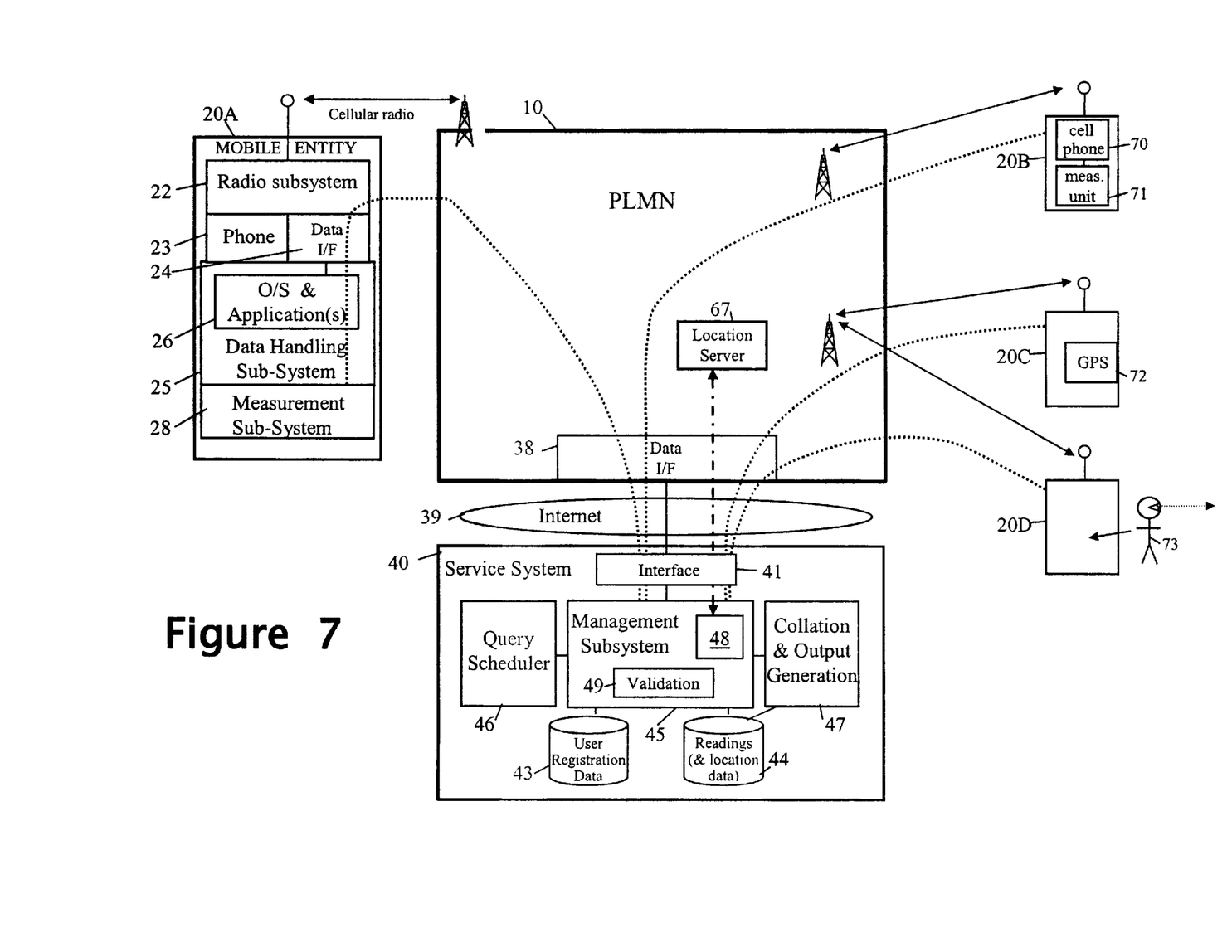
FIG. 7 is a diagram showing a distributed telemetry service system and arrangement embodying the invention.

A distributed telemetry method and service system embodying the invention will now be described with reference to FIG. 7 which shows the service system 40 as connected via the public Internet 39 to a data-capable bearer service of PLMN 10. It is to be understood that the present invention is not limited to the specifics of the mobile entities and communication infrastructure shown in FIG. 7 and the generalisations discussed above in relation to FIGS. 1 to 6 regarding these elements and how location data concerning the mobile entities is provided, apply equally to the operational context of the service system 40. Furthermore, whilst the service system 40 is shown as connected to the PLMN 10 via the public Internet 39, this connection could be via some other third-party network or direct to the PLMN, or the service system could be internal to the PLMN and controlled by the PLMN operator (for example, the service system could be located on a GPRS network 17 inside the PLMN firewall).

The distributed telemetry method to be described is based on having a registered group of users of mobile entities 20 (for example, cell phones) participate in the collection of geographically dispersed readings about a parameter of interest. The service system 40 serves to coordinate the activities of the registered users, to receive the readings they take, and collate and analyse the readings.

The service system 40 comprises a management subsystem 45 which connects via interface 41 to the Internet 39 and from there to a data-capable bearer service interface 38 of the PLMN 10. Users of mobile entities 20 that wish to participate in the distributed telemetry method register with the service system and their details are recorded in database 41.

A user can, for example, register either over the Internet from a home PC with dial-up internet access or from a WAP-enabled mobile entity 20. Participation in the distributed telemetry method will generally be voluntary though as will be described below, it is possible that the PLMN operator may operate such a method in relation to all connected mobile entities that have suitable capabilities without seeking user consent in order to carry out telemetry on the mobile network itself.

To encourage voluntary participation various incentives can be offered, not only for signing up but also for each reading returned by the user.

The user details recorded during registration will generally include mobile entity contact number, a user ID, and whether or not the user can provide location information from their mobile entity (for example, if it is equipped with a GPS system—see unit 73 of mobile entity 20C) or whether such information must be obtained by the management subsystem (see element 48) from a location server 67 of the PLMN (in this latter case, appropriate authorisation may be required from the user to access the user's location data).

The service system will also wish to record what type of parameters the user is capable of providing readings about. Readings concerning a parameter can generally be collected in the following ways:
  (a)—by measurement of the parameter by functionality contained in the mobile entity itself (see measurement subsystem 28 in mobile entity 20A where all elements of the entity are integrated into one device, and mobile measurement unit 71 of entity 20B which is separate from, but connectable to. a cell phone 70 also forming part of entity 20B);

(b)—by user input to the mobile entity of a reading taken by another apparatus (see user 73 of mobile entity 20D);

(c)—by user input to the mobile entity of a user observation of the parameter of interest (see, again, user 73 of mobile entity 20D)-in this case, the parameter may relate to virtually anything ranging from the weather to the mental state of the user.

A user will generally be capable of type (c) readings if nothing else; types (a) and (b) will depend on what equipment a user has. It is possible that the operator of the service system is willing to provide suitable measuring equipment to registered users to enable them to take particular measurements.

Of course, if the service system 40 is only interested in collecting readings about one specific parameter or type of parameter, then the service system will simply only register those users who can take the appropriate readings. However, where the service system is intended to be able to take readings on a variety of differing parameters then it is necessary to record the capabilities of each user in database 43. For simplicity, the following description is confined to a set of registered users who can take readings about a specific parameter of interest, it being understood that where the service system is intended to provide more general telemetry capabilities, it is up to the management subsystem 45 to select the subset of registered users capable of taking readings about a parameter currently of interest.

As noted above, one role of the service system is to coordinate the taking of measurements about the parameter of interest by the registered users. Coordination is important since generally the readings will need to be taken within a limited time reading in order to be valid; the size of this time window will depend on the nature of the parameter to be measured, for example, atmospheric pressure readings for establishing a barometric map should be taken within the same hour whereas readings about the current price of a standard service can generally be taken in the course of a longer time window such as a week. It is the task of the query scheduler 46 to organise when readings of a parameter of interest are to be taken, to set the validity time window, to specify any other restrictions regarding the readings (such as geographic area of interest), and to arrange for the triggering of the taking of readings. This triggering can be effected in one of two main ways, namely:

(I)—By the service system sending out a message over the mobile radio infrastructure for triggering the taking of readings by the relevant registered users or their mobile entities (where measurement functionality is incorporated in the mobile entity, it may be possible to trigger automatically the taking of readings without involving the user; however, it may be necessary to alert the user either to take the reading and input it into the mobile entity or to connect up a separate measuring unit, such as unit 71). The trigger message can be broadcast to the mobile entities by any suitable mechanism (for a GSM PLMN, the SMS service can, for example, be used). Where a geographic restriction is placed on what readings are of interest, it is the responsibility of the service system to implement this restriction for mobile entities who cannot determine their own location (to do this, the service system must query the location server in respect of all mobile entities that according to the database 43 have no location determining capability, the trigger message then not being sent to those entities determined as being outside the area of interest. Where a mobile entity can ascertain its own location, that entity can be left to decide whether it is in the area of interest and therefore should respond. Of course, the service system could carry out the location filtering for all mobile entities rather than just for those entities that have no means for determining location themselves.

(II) By the service system specifying in advance to the mobile entities when readings are required to be taken, it then being the responsibility of each mobile entity to take the reading at that time or alert the user to do so. Where a geographic restriction is associated with the reading to be taken, the mobile entity will, if capable, ascertain its location before deciding whether it is to take the reading; if the mobile entity cannot ascertain its location, then it will be up to the server system to check the geographic limitation in due course when it queries location server 67 for the location of the mobile entity.

The validity time window for taking a reading can also be supplied to the mobile entities so as to enable each entity to decide whether it can satisfy this validity test and therefore whether or not it should cause the reading to be taken.

However triggered, once a mobile entity determines that it should take a reading or cause the reading to be taken, it either takes the reading or alerts the user to do so. Where the mobile entity takes the reading and it is capable of ascertaining its location, it is arranged to immediately location stamp the reading. Where the reading is simply input into the mobile entity, then if the latter is capable of ascertaining its location, it is also arranged to immediately location stamp the reading at the time of input. In all other cases, location stamping of the reading has to be done by the service system in conjunction with the location server.

Once the reading is available to a mobile entity, the latter will generally timestamp it and associate with it the user ID of the user concerned and any location data established by the mobile entity. The reading, plus associated data, is then sent via a data-capable bearer service of the PLMN to the service system. This sending can be effected immediately or delayed and effected:

at a specified time; or at a randomly determined time within an overall sending time window; or upon request for the reading by the service system; or during a low tariff period for sending data through the mobile radio infrastructure.

Upon the service system receiving a reading from a mobile entity it stores it in a readings database 44. A validation unit 49 of the management system then checks that the reading timestamp is within the validity window specified by the query scheduler. In addition, if no location data is associated with the reading it is ascertained from the location server 67 by unit 48; of course, this will generally result in a location being associated with the reading that corresponds to the location of the mobile entity at the time the reading is location processed by unit 48 of service system 40. This gives rise to the possibility of error regarding the location where the reading was taken particularly if the reading was not sent immediately; if this is a potential problem, it is possible to arrange for the unit 48 to ask for the location server to provide the location of the mobile entity at the time the reading was taken according to the timestamp associated with the reading—this is only possible if the location server has been asked to track the location of the entity and record its location as a function of time. Where the validity time window is small, an alternative would be to have the unit 48 ask the location server, at the time that the mobile entity should be taking the reading, to provide the mobile entity's location.

After all returned readings have been validated and any required location information fetched from location server 67, a collation and output generation block 47 of the service system assembles all the relevant readings into a representation of the geographic variation of the parameter of interest.

Possible uses of the distributed telemetry system are many and varied and examples include:

Mapping the received mobile radio signal strength at a mobile entity from at least one base station, the identity of the or each base station for which the mobile entity takes a reading being sent with the reading to the service system whereby to enable a signal strength map to be built up for each base station. Such a measurement would be of interest to the PLMN operator and the latter may operate their own distributed telemetry system of the above general form simple for making such measurements with all PLMN users being counted as registered users. Since signal strength information is in any event available within a cellular radio device, no substantial adaptation to the mobile entity is required to implement such a measurement method.

Mapping a weather-related parameter being either a measured parameter (such as barometric pressure)or a user assessed parameter (such as percentage cloud cover);

Mapping traffic congestion by obtaining vehicle speed readings from mobile entities being carried in a vehicle;

Mappings price variations for standard goods or services;

Mapping sociological factors.

With respect to the origin of the requests for distributed telemetry, such requests can be internally generated by the operator of the service system, arise from requests made by registered users, or be generated by fee paying (or other) customers.

What is claimed is:

1. A distributed telemetry method, comprising the steps of:
   (a) coordinating the taking of readings of a parameter over a geographic area by mobile entities or their users;
   (b) using the mobile entities to send the readings to a service system via a mobile radio infrastructure;
   (c) providing to the service system the location of each mobile entity that sends a reading; and
   (d) collating the readings and location information at the service system to provide a representation of the geographic variation of said parameter;
said parameter being measurable substantially wherever a user might be in said geographic area and being unrelated to the operation of said mobile communication infrastructure.

2. A method according to claim 1, comprising the preliminary step of enabling users of mobile entities to register voluntarily with the service system to provide parameter readings via their mobile entities, the service system being responsible for coordinating the taking of reading by its registered users.

3. A method according to claim 2, including the offering of an incentive for users to register with the service system and provide readings to it.

4. A method according to claim 1, wherein step (a) is effected by:
   the service system informing registered users of a predetermined time when a reading is to be taken; and
   registered users taking readings;
the actual time of taking of a reading being returned with each reading in step (b) and step (d) involving only considering a said reading as valid if its actual time of taking in within a set time window encompassing said predetermined time.

5. A method according to claim 1, wherein the step of sending a reading to the service system is delayed and effected at a randomly determined time within an overall time window.

6. A method according to claim 1, wherein the service system is arranged to handle readings sent with associated location data and readings sent without location data, the service system in this latter case contacting a location server of the mobile radio infrastructure for the required location information concerning the sending mobile entity.

7. A method according to claim 1, wherein the readings relate to one of the following parameters:
   a weather-related parameter being either a measured parameter or a user assessed parameter;
   vehicle traffic speed parameter for mobile entities being carried in a vehicle;
   a sociological observation parameter.

8. A distributed telemetry system comprising:
   a mobile radio infrastructure;
   a service system connected to the mobile radio infrastructure and comprising a database of registered users, apparatus for receiving data via the mobile radio infrastructure, and data collation apparatus;
   a plurality of mobile entities associated with respective registered users, each mobile entity having apparatus for sending reading data to the service system through the mobile radio infrastructure;
   an arrangement for causing the coordinated taking of reading data, by the registered users or their mobile entities, about a particular parameter that is measurable substantially wherever a user might be in said geographic area and is unrelated to the operation of said mobile communication infrastructure; and
   location-providing apparatus for providing the service system with the location of each mobile entity that sends reading data to the service system;
   the data collation apparatus being operative to collate the reading data and location information to provide a representation of the geographic variation of said parameter.

9. A system according to claim 8, wherein the arrangement for causing the coordinated taking of reading data comprises means for sending out a message over the mobile radio infrastructure requesting at least some of the registered users to take readings at a predetermined time; the said apparatus provided in each mobile entity for sending reading data to the service system, being operative to send with the reading data a timestamp indicative of when the reading was actually taken by the user, and the data collation apparatus being operative to use only those readings that according to the timestamp accompanying the reading lie within a set time window encompassing said predetermined time.

10. A method according to claim 2, wherein registration of a said user with the service system involves recording at the service system for what types of parameters the user is capable of providing readings; the service system in coordinating the taking of readings in respect of a particular parameter only requesting readings from those of the registered users that are recorded as being capable of providing readings of that parameter.

11. A system according to claim 8, wherein the service system further comprises a registration subsystem for enabling users of mobile entities to register voluntarily with the service system to provide parameter readings via their mobile entities, the registration subsystem including said database.

12. A system according to claim 11, wherein the registration subsystem is operative to record in said database for what types of parameters a registering user is capable of providing readings; the said arrangement for causing the coordinated taking of reading data being operative in coordinating the taking of readings in respect of a particular parameter to only request readings from those of the registered users that are recorded in said database as being capable of providing readings of that parameter.

* * * * *